Aug. 3, 1965  G. SCHNEIDER  3,198,668
TWO LAYER ZINC ANODE
Filed Feb. 13, 1961  2 Sheets-Sheet 1

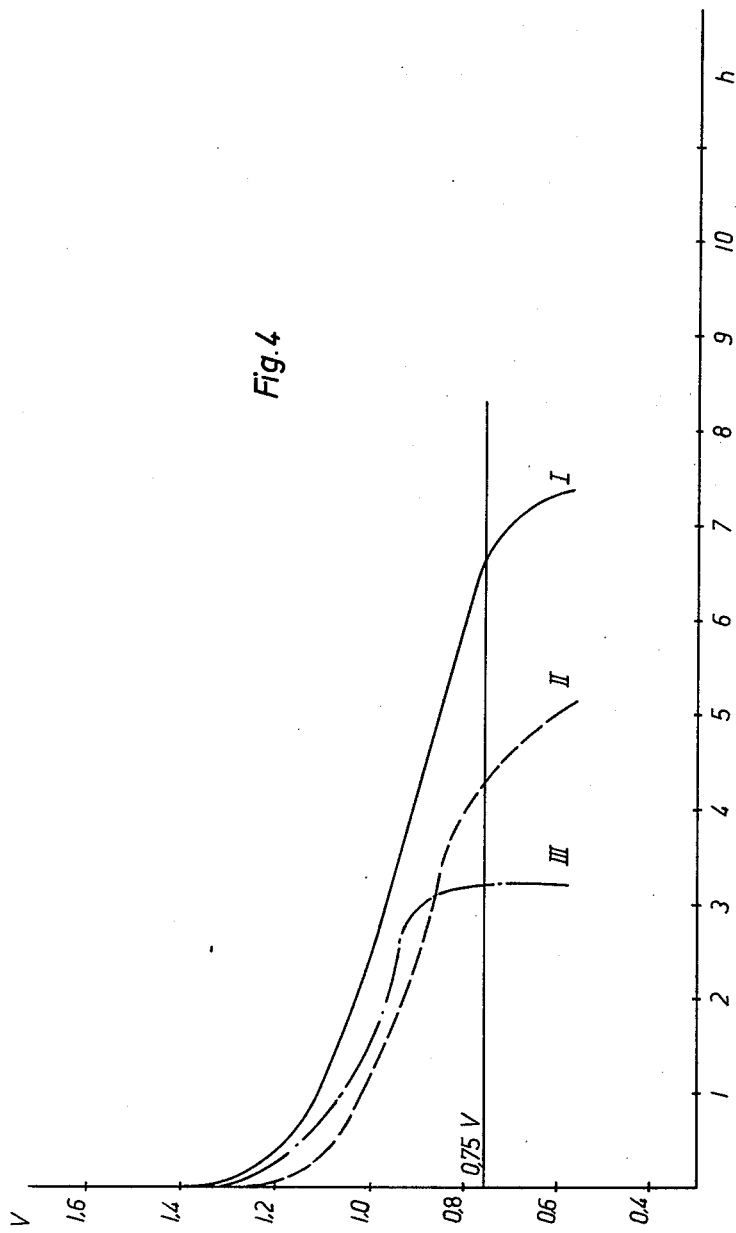

3,198,668
TWO LAYER ZINC ANODE
Gerhard Schneider, Ellwangen, Jagst, Germany, assignor to Pertrix-Union G.m.b.H., Ellwangen, Jagst, Germany, a company of Germany
Filed Feb. 13, 1961, Ser. No. 114,574
Claims priority, application Germany, Feb. 17, 1960, P 24,453
12 Claims. (Cl. 136—130)

The present invention relates to improvements in primary or secondary battery cells, particularly cells with an alkaline electrolyte, and to novel anodes for such cells.

Anodes for cells of this type have been made of zinc and it has also been proposed to provide such anodes in the form of wound elements to obtain an increased anode surface in a simple manufacturing step.

In conventional cells with a wound zinc anode, the windings consist of a perforated, corrugated zinc sheet, or an expanded zinc sheet, or a paper web carrying a layer of zinc powder or flakes. Perforated or expanded zinc sheets have been found unsatisfactory in respect of properly balancing the amount of zinc and the necessary increase in the surface. While a zinc powder layer gives a satisfactory wound anode surface, the internal resistance of such an electrode is too large, due to the interface resistance between the individual zinc particles. This is particularly noticeable when the cell is recharged, at which time such electrodes produce early gassing due to their uneven current density.

It is the primary object of the present invention to provide a zinc anode for primary and secondary battery cells, which permits improved recharging of the cell and simultaneously inhibits self-discharge of the cell.

The above and other objects and advantages are accomplished in accordance with this invention by providing a two-layer zinc electrode, one layer consisting of an expanded zinc sheet and the other layer consisting of particulate zinc carried by a fibrous sheet, such as paper, said fibrous sheet being arranged adjacent that side of the expanded zinc sheet which faces the cathode or depolarizer of the cell and said particulate zinc being carried by that side of the fibrous sheet which faces the expanded zinc sheet.

In a negative wound electrode of this structure, the current density is even over the entire surface of the electrode during discharge as well as subsequent charge.

It has been found that primary cells with such anodes may frequently be recharged, for instance, up to 30 to 50 cycles while conventional primary cells could be recharged only three to five times, at the most.

Furthermore, the internal resistance of such two-layer anodes is so small that it may be used for high current densities.

The above and other features of the present invention will be more fully explained in the following detailed description of a preferred embodiment thereof, taken in conjunction with the accompanying drawing wherein FIG. 1 is a vertical section of a cylindrical dry cell incorporating the invention;

FIG. 4 is a graph showing comparative tests of conventional dry cells and the dry cell of FIG. 1.

Figure 1:
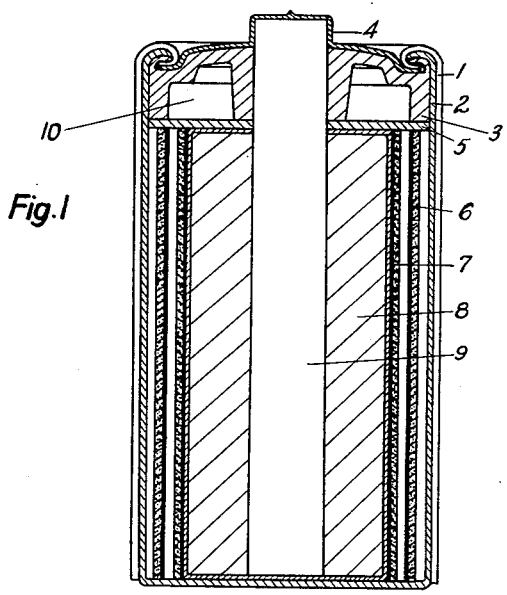

The dry cell shown in FIG. 1 is conventional in all respects except for the structure of the anode. The cell includes a central carbon rod 9 embedded in the black mix 8 which serves as the cathode or depolarizer of the cell. The carbon rod is the collector and conductor of electric current from the cathode to the positive terminal external to the cell. The depolarizer may consist of a conventional mix of manganese dioxide and carbon black, such as acetylene black or graphite, and is surrounded by a separator 7 which preferably consists of an absorbent paper. The wound, two-layer anode 6 surrounds the separator 7 and will be more fully described hereinafter.

The entire cell is contained in zinc can or cup 2 the side walls of which are shown enveloped by a suitable plastic jacket 1, for instance, of polyethylene, polypropylene, polyamide resin, or the like. The cell is closed by a suitable plastic cover 3 of similar insulating resin, if desired. In the illustrated embodiment, the cover has a central sleeve and a circumferential, annular flange extending to and pressing against a suitable plastic washer 5 which engages the depolarizer and the wound electrode, preventing swelling of the depolarizer mass. The central sleeve of cover 3 tightly seals the carbon rod 9 and defines an air space 10 with the circumferential flange to provide expansion space for evolving gases. A contact cap 4, preferably of brass, provides improved electrical contact for the positive electrode. The zinc cap and plastic jacket are shown folded over on top to provide a bead engaging contact cap 4 and plastic cover 3.

As previously mentioned, all of this structure is conventional and so are the cell materials, the black mix, and the electrolyte having the compositions, for instance, given on page 309 of "Primary Batteries," by George Wood Vinal, John Wiley & Sons, Inc., New York, 1950.

Figure 3:
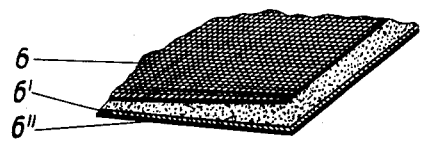

The novel feature is the anode which, in the illustrated embodiment is a wound electrode having two windings. As best shown in FIG. 3, the negative electrode of the present invention consists of a first layer 6 of expanded zinc and a second layer of a swellable paper 6", for instance a blotting paper, which is coated on the side facing the expanded zinc sheet with a layer 6' of zinc powder or zinc flakes.

Figure 2:
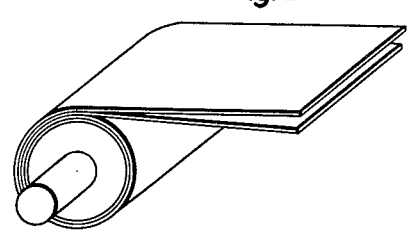
FIGS. 2 and 3 illustrate the structure of the two-layer anode.

As shown in FIG. 2, the two layers of the anode may be wound together on a beam wherefrom they may be supplied continuously to a manufacturing station where they are wound on the depolarizer bobbins.

In accordance with a preferred embodiment of the invention, the mesh size of the expanded zinc sheet and the grain size of the particulate zinc layer are of about the same order of magnitude. Preferred mesh and grain sizes are between about 0.08 mm. and about 0.25 mm., particularly between about 0.15 mm. and about 0.20 mm.

While reference is made throughout the specification and claims to "zinc" anodes, this term is understood to include conventional zinc alloys "Primary Batteries," Vinal, page 11 or alloys with

|  | (1) | (2) | (3) |
|---|---|---|---|
| Pb _____percent__ | 0.10 | 0.90 | 0.04 |
| Cd _____do___ | 0.06 |  |  | used for cell anodes, such as amalgamated zinc which contains from 1–10%, preferably 3–4%, of mercury, by weight of the zinc.

It has also been found advantageous for the recharging capacity of the cell to make the particulate zinc layer of a different zinc alloy than the expanded zinc sheet, the particulate zinc being less noble than the expanded zinc sheet so that it is dissolved first during the operation of the cell, there being a small differential in the potential of the two layers. A way to do this is to make the expanded zinc sheet out of an alloy consisting of 0.90% Pb, while the less noble particulate zinc paper is made of zinc with a very low content of Pb, for example 0.04% Pb. The total amount of zinc in particulate and sheet form is so determined in relation to the cathode that both are exhausted approximately at the same time so that the outer zinc container, which encloses the cell and constitutes the electric current collector and conductor for the negative electrode, is not or only slightly corroded during operation.

It is preferred to use a swellable paper as carrier for the particulate zinc layer and to add a swelling agent to the paper, such as starch, flour or carboxymethylcellulose.

FIG. 4 graphically shows the outstanding operating properties of dry cells incorporating the anode of the present invention, as compared to conventional dry cells. The three cells were identical in every respect, except for their anodes, and were of the type shown in FIG. 1.

The three curves plot the discharge of the cells in volts through a resistance of 1.25 ohms over the number of hours indicated on the abscissa of the graph, curve I giving the operation of the cell according to the invention, curve II indicating the operation of an identical cell which, however, has a one-layer anode of particulate zinc carried on a paper sheet, and curve III referring to another identical cell the anode of which, however, is an expanded zinc sheet.

In the case of cell I, the total weight of the zinc in the anode was about 10 g., the mesh size and the grain size of the expanded sheet and the particulate layer, respectively, being about 0.15 mm. and the particulate zinc being a zinc amalgam containing 3% mercury, by weight of the zinc, while the zinc of the expanded sheet was a zinc amalgam containing 0.2% mercury, by weight of the zinc. The particulate zinc was coated on a sheet of blotting paper impregnated with starch and flour as a swelling agent.

In the case of cell II, the weight of the particulate zinc layer was about 9 grams. Except for an increased thickness of the zinc layer, the nature of the anode was identical with that of cell I, except that it omitted the expanded zinc sheet.

The weight of the expanded zinc sheet anode of cell III was about 10 grams. Except for the increased thickness of the expanded zinc sheet, the nature of the anode was again identical with that of cell I, except that it omitted the particulate zinc layer carried by a paper sheet.

In all three cells, there were used 42 grams of black mix for the depolarizer bobbin, the mix having the following composition:

| | Grams |
|---|---|
| Manganese dioxide | 770 |
| Graphite | 230 |
| Electrolyte | 200 |

The electrolyte had the following composition:

| | Grams |
|---|---|
| Potassium hydroxide | 100 |
| Zinc oxide | 16 |
| Water | 100 |

Comparison between the three discharge curves fully shows the superiority of cell I, which uses the two-layer anode of the present invention, over either of the conventional cells II and III, the discharge time being more than doubled in comparison with cell III and increased by about 50% in comparison with cell II. In addition, the following terminal voltages were found with a load of 1.25 ohms:

| | V. |
|---|---|
| Cell I | 1.40 |
| Cell II | 1.32 |
| Cell III | 1.38 |

Comparative values for the short circuit current are as follows:

| | A. |
|---|---|
| Cell I | 15.0 |
| Cell II | 6.0 |
| Cell III | 14.0 |

Thus, the superiority of the novel battery cells of this invention is clearly established.

While the present invention has been particularly described in connection with dry cells, especially cells with wound anodes, it will be clearly understood that it is applicable to any type of primary cell, such as plate or button cells, as well as to secondary cells. Many variations and modifications may occur to the skilled in the art, particularly after benefiting from the present teaching, without departing from the spirit and scope of the invention as defined in the appended claims.

I claim:

1. A two-layer zinc electrode for a battery cell, said electrode consisting of an expanded zinc sheet and, adjacent thereto, a layer of a particulate zinc alloy having a small differential in potential in relation to the expanded zinc sheet, the zinc alloy being less noble than the expanded zinc sheet, a fibrous sheet being provided for carrying the particulate zinc alloy layer.

2. A two-layer zinc electrode for a battery cell, said electrode consisting of an expanded zinc sheet and, adjacent thereto, a layer of a particulate zinc alloy having a small differential in potential in relation to the expanded zinc sheet, the zinc alloy being less noble than the expanded zinc sheet, a fibrous sheet being provided for carrying the particulate zinc alloy layer, the mesh size of the expanded zinc sheet and the grain size of the particulate zinc layer being of about the same order of magnitude.

3. A two-layer zinc electrode for a battery cell, said electrode consisting of an expanded zinc sheet, and adjacent thereto, a layer of a particulate zinc alloy having a small differential in potential in relation to the expanded zinc sheet, the zinc alloy being less noble than the expanded zinc sheet, a fibrous sheet being provided for carrying the particulate zinc alloy layer, the mesh size of the expanded zinc sheet and the grain size of the particulate zinc alloy layer being between about 0.08 mm. and about 0.25 mm.

4. A two-layer zinc electrode for a battery cell, said electrode consisting of an expanded zinc sheet and, adjacent thereto, a layer of a particulate zinc alloy having a small differential in potential in relation to the expanded zinc sheet, the zinc alloy being less noble than the expanded zinc sheet, a fibrous sheet being provided for carrying the particulate zinc alloy layer, the mesh size of the expanded zinc sheet and the grain size of the particulate zinc alloy layer being between about 0.15 mm. and about 0.20 mm.

5. The two-layer zinc electrode for a battery cell, said electrode consisting of an expanded zinc sheet and, adjacent thereto, a layer of a particulate zinc alloy having a small differential in potential in relation to the expanded zinc sheet, the zinc alloy being less noble than the expanded zinc sheet, a swellable paper sheet being provided for carrying the particulate zinc alloy layer.

6. The two-layer zinc electrode for a battery cell, said electrode consisting of an expanded zinc sheet and, adjacent thereto, a layer of a particulate zinc alloy having a small differential in potential in relation to the expanded zinc sheet, the zinc alloy being less noble than the expanded zinc sheet, a swellable paper sheet being provided for carrying the particulate zinc alloy layer, said paper sheet containing a swelling agent.

7. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, a fibrous sheet being provided for carrying the particulate zinc alloy layer, said particulate zinc alloy layer being arranged adjacent that side of the expanded zinc sheet which faces the cathode and being carried by that side of the fibrous sheet which faces the expanded zinc sheet.

8. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, a fibrous sheet being provided for carrying the particulate zinc alloy layer, said particulate zinc alloy layer being arranged adjacent that side of the expanded zinc sheet which faces the cathode and being carried by that side of the fibrous sheet which faces the expanded zinc sheet, the mesh size of the expanded zinc sheet and the grain size of the particulate zinc alloy layer being of about the same order of magnitude.

9. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, the mesh size of the expanded zinc sheet and the grain size of the particulate zinc alloy layer being between about 0.08 mm. and about 0.25 mm., said particulate zinc alloy layer being arranged adjacent that side of the expanded zinc sheet which faces the cathode and being carried by that side of a fibrous sheet which faces the expanded zinc sheet, said fibrous sheet being provided for carrying the particulate zinc alloy layer.

10. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, the mesh size of the expanded zinc sheet and the grain size of the particulate zinc alloy being between about 0.15 mm. and about 0.20 mm., said particulate zinc alloy layer being arranged adjacent that side of the expanded zinc sheet which faces the cathode and being carried by that side of a fibrous sheet which faces the expanded zinc sheet, said fibrous sheet being provided for carrying the particulate zinc alloy layer.

11. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, said particulate zinc alloy layer being arranged adjacent that side of the expanded zinc sheet which faces the cathode and being carried by that side of a swellable paper sheet which faces the expanded zinc sheet, said swellable paper sheet being provided for carrying the particulate zinc alloy layer.

12. A primary battery cell comprising a cathode, an alkaline electrolyte and a wound zinc anode, said anode consisting of two layers, one of said layers being an expanded zinc sheet and the other layer consisting of a particulate zinc alloy having a small differential in potential in relation to the expanded zinc sheet, the zinc alloy being less noble than the expanded zinc sheet, said particulate zinc alloy layer being arranged adjacent that side of the expanded zinc sheet which faces the cathode and being carried by that side of a swellable paper sheet which faces the expanded zinc sheet, said swellable paper sheet being provided for carrying the particulate zinc alloy layer, said swellable paper sheet containing a swelling agent.

References Cited by the Examiner

UNITED STATES PATENTS

| | | | |
|---|---|---|---|
| 2,422,045 | 6/47 | Ruben | 136—107 |
| 2,501,673 | 3/50 | Glassner | 136—107 |
| 2,739,179 | 3/56 | Barrett | 136—30 |
| 2,994,625 | 8/61 | Mendelsohn et al. | 136—20 |
| 3,069,486 | 12/62 | Solomon et al. | 136—30 |
| 3,099,899 | 8/63 | Horn et al. | 136—57 |

FOREIGN PATENTS 607,815  11/60  Canada.

JOHN H. MACK, *Primary Examiner.*

JOHN R. SPECK, *Examiner.*